United States Patent
Nagashima (10) Patent No.: US 7,616,210 B2
(45) Date of Patent: Nov. 10, 2009

(54) MEMORY APPARATUS AND MEMORY CONTROL METHOD

(75) Inventor: Fumitada Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 11/504,606

(22) Filed: Aug. 16, 2006

(65) Prior Publication Data
US 2007/0046681 A1  Mar. 1, 2007

(30) Foreign Application Priority Data
Aug. 23, 2005 (JP) ............... 2005-241557

(51) Int. Cl.
*G09G 5/36* (2006.01)

(52) U.S. Cl. ............... 345/557; 711/118

(58) Field of Classification Search ............ None
See application file for complete search history.

(56) References Cited

U.S. PATENT DOCUMENTS

| | | | |
|---|---|---|---|
| 5,760,780 A * | 6/1998 | Larson et al. ............... 345/422 |
| 5,822,762 A * | 10/1998 | Nishida et al. ............... 711/139 |
| 5,848,428 A * | 12/1998 | Collins ............... 711/127 |
| 5,898,849 A * | 4/1999 | Tran ............... 712/203 |
| 6,282,706 B1 * | 8/2001 | Chauvel et al. ............... 717/150 |
| 6,427,190 B1 * | 7/2002 | Hansen ............... 711/129 |
| 6,449,694 B1 * | 9/2002 | Burgess et al. ............... 711/128 |
| 6,535,960 B1 * | 3/2003 | Nishida et al. ............... 711/129 |
| 6,567,952 B1 * | 5/2003 | Quach et al. ............... 714/800 |
| 6,745,291 B1 * | 6/2004 | York ............... 711/128 |
| 7,051,184 B2 * | 5/2006 | Lane ............... 711/220 |
| RE39,500 E * | 2/2007 | Hansen ............... 711/203 |
| 7,437,513 B2 * | 10/2008 | Saida et al. ............... 711/128 |
| 2004/0225859 A1 * | 11/2004 | Lane ............... 711/202 |
| 2005/0275658 A1 * | 12/2005 | Sasaki et al. ............... 345/557 |
| 2006/0036811 A1 * | 2/2006 | Dieffenderfer et al. ...... 711/136 |
| 2006/0174083 A1 * | 8/2006 | Barrick et al. ............... 711/169 |
| 2007/0260818 A1 * | 11/2007 | Damaraju et al. ............ 711/128 |
| 2009/0063774 A1 * | 3/2009 | Chan et al. ............... 711/128 |

FOREIGN PATENT DOCUMENTS

| | | |
|---|---|---|
| GB | 1 595 122 | 8/1981 |
| GB | 0 969 413 | 1/2000 |

* cited by examiner

*Primary Examiner*—Kee M Tung
*Assistant Examiner*—David H Chu
(74) *Attorney, Agent, or Firm*—Fitzpatrick, Cella, Harper & Scinto (57) ABSTRACT

A memory apparatus having first and second memories generates an address corresponding to input data, and compares an address corresponding to data stored in the second memory with the generated address. The memory apparatus reads out data corresponding to the generated address from the second memory, and determines the number of bits of the address to be compared in accordance with the comparison result. When data corresponding to the generated address is not stored in the second memory, the memory apparatus reads out the corresponding data from the first memory.

10 Claims, 9 Drawing Sheets

TAG MEMORY

MEMORY APPARATUS AND MEMORY CONTROL METHOD

BACKGROUND OF THE INVENTION

1. Field of the Invention

The present invention relates to a memory apparatus and memory control method.

2. Description of the Related Art

In recent years, scanners, video cameras, and the like have prevailed as input devices. Also, various color printers using an ink-jet system, dye sublimation system, electrophotographic system, and the like have prevailed as output devices. These color input and output devices respectively have unique color spaces (device color spaces). In order to print (display) data read by an input device by an output device, processing for converting the color space of the input device into that of the output device (to be referred to as "color space conversion" hereinafter) is required. For example, when RGB image data scanned by a scanner is to be printed, the RGB color space of the scanner is converted into a standard color space (e.g., AdobeRGB proposed by Adobe Systems Incorporated). After that, the standard color space is converted into a CMYK color space defined by cyan, magenta, yellow, and black as that of color materials (inks or toners) of a printer.

Even in identical RGB color spaces such as RGB color spaces of a scanner and monitor, color conversion is done if they have different color space characteristics (color gamuts). More specifically, when an image scanned by a scanner is to be displayed on a monitor, conversion from a scanner RGB color space to a monitor RGB color space is required to attain color matching.

As one of such color conversion processing methods, a color conversion method that combines a three-dimensional lookup table (3D-LUT) and interpolation operations is known. As an interpolation operation method, tetrahedral interpolation disclosed in GB1595122, EP0969413, or the like is known.

However, with the color conversion method based on 3D-LUT+interpolation, when the number of grids per axis of the 3D-LUT is increased to improve the color conversion precision, the size of the LUT increases by the third power for three dimensions. Also, a digital camera to which a color filter other than RGB is added to improve the color reproducibility is available. In this case, the size of the LUT increases by the number of grids to the fourth power, thus requiring a huge memory size.

On the other hand, some output apparatuses such as printers or the like use many color materials (inks) to improve the color reproducibility, gray balance, and granularity. In this case, the LUT size increases in proportion to the number of color materials.

In order to reduce the cost of the LUT, a color conversion method which stores all data of the LUT in a storage (memory) which has low cost but low speed, and loads only data required in arithmetic operations onto a high-speed cache has been examined.

However, in such cache mechanism, some natures of input data result in poor efficiency. For example, a printer handles objects having different natures such as text, line image, photo, graphics, and the like. However, the number of colors used in text and line image objects is considerably small, and continuity of colors is small. However, if the number of entries of a tag is insufficient, the hit rate is low, resulting in poor efficiency. On the other hand, photo and CG objects, and the like include many moderate gradation parts, and coherence between pixels is high. However, if the number of entries of a tag is large, the fill efficiency of a cache deteriorates, resulting in poor data conversion efficiency.

SUMMARY OF THE INVENTION

It is an object of the present invention to efficiency read out data from a memory.

It is another object of the present invention to provide a memory apparatus comprising: a first memory unit; a second memory unit; a generation unit adapted to generate an address corresponding to input data; a comparison unit adapted to compare an address corresponding to data stored in the second memory unit and the address generated by the generation unit; a read-out unit adapted to read out data corresponding to the address generated by the generation unit from the second memory unit; and a determination unit adapted to determine the number of bits of the address to be compared by the comparison unit in accordance with a comparison result of the comparison unit, wherein when the data corresponding to the address generated by the generation unit is not stored in the second memory unit, the read-out unit reads out the corresponding data from the first memory unit.

It is still object of the present invention to provide a memory control method in a memory apparatus which has a first memory and a second memory, comprising: generating an address corresponding to input data; comparing an address corresponding to data stored in the second memory and the generated address; reading out data corresponding to the generated address from the second memory; and determining the number of bits of the address to be compared in accordance with the comparison result, wherein the read-out step includes a step of reading out, when the data corresponding to the generated address is not stored in the second memory, the corresponding data from the first memory.

Further features of the present invention will become apparent from the following description of exemplary embodiments (with reference to the attached drawings).

DESCRIPTION OF THE EMBODIMENTS

Preferred embodiments of the present invention will be described in detail hereinafter with reference to the accompanying drawings.

A data processing apparatus (memory apparatus) according to this embodiment holds an LUT (lookup table). The data processing apparatus (memory apparatus) according to this embodiment reads out LUT data corresponding to input data of those (LUT data) held by the LUT, applies predetermined conversion processing (interpolation processing) to the readout LUT data, and externally outputs the converted data.

Figure 1:
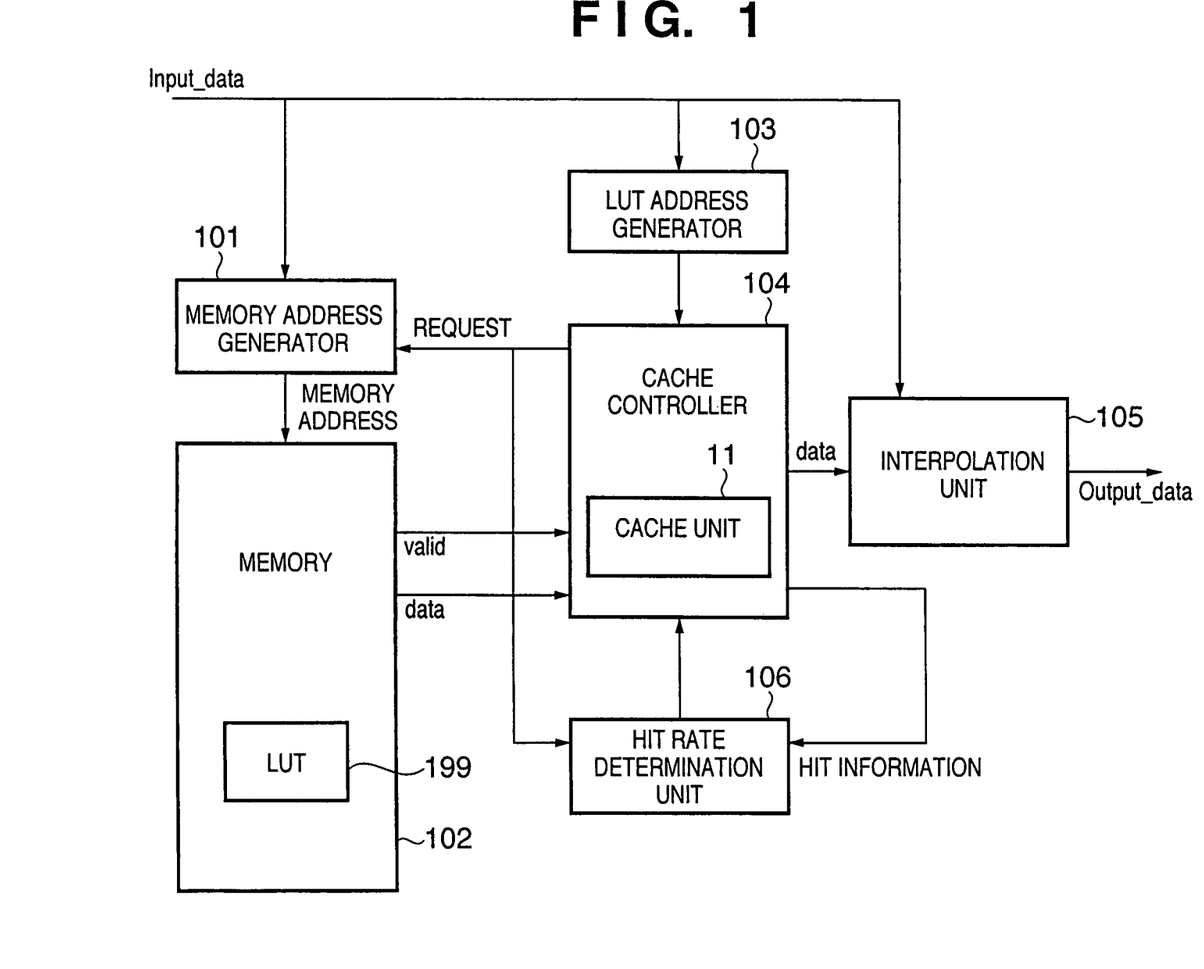
FIG. 1 is a block diagram showing the hardware arrangement of a data processing apparatus according to the first embodiment of the present invention.

FIG. 1 is a block diagram showing the hardware arrangement of the data processing apparatus (memory apparatus) according to this embodiment.

A memory 102 stores data of an LUT 199. Data stored in the LUT 199 will be referred to as "LUT data" hereinafter.

An LUT address generator 103 generates an LUT address (to be described later) based on externally input data (Input_data). Normally, the LUT address is generated based on higher-order bits of respective input axes (e.g., RGB) in the input data (Input_data). The generated LUT address is output to a cache controller 104.

The cache controller 104 determines whether or not data held at an address in the memory 102 (LUT 199) specified by the LUT address received from the LUT address generator 103 has already been stored in a cache memory (a data memory 4 in a cache unit 11) built in itself. If it is determined that the data has already been stored, the cache controller 104 outputs this data to an interpolation unit 105. On the other hand, if it is determined that such data has not been stored, the cache controller 104 requests the memory address generator 101 to read out data which is generated by the memory address generator 101 in accordance with input data and is held at the address in the memory 102, and outputs the readout data to the interpolation unit 105. Detailed operations of the cache controller 104 will be described later.

Normally, the address of the memory 102 can be easily calculated by adding a base address of the memory 102 to the LUT address. However, in case of a 17-grid LUT in which the number of grids per axis is not 2 to the n-th power, generation of a memory address often requires complicated arithmetic operations.

The interpolation unit 105 obtains converted data by calculating the weighted means of the data output from the cache controller 104 based on lower-order bits of the respective axes of input data Input_data.

The hit rate determination unit 106 determines a cache hit rate. The hit rate (hit information) is used to change assignment of the bit widths of a tag address and line address of a cache.

Figure 2:
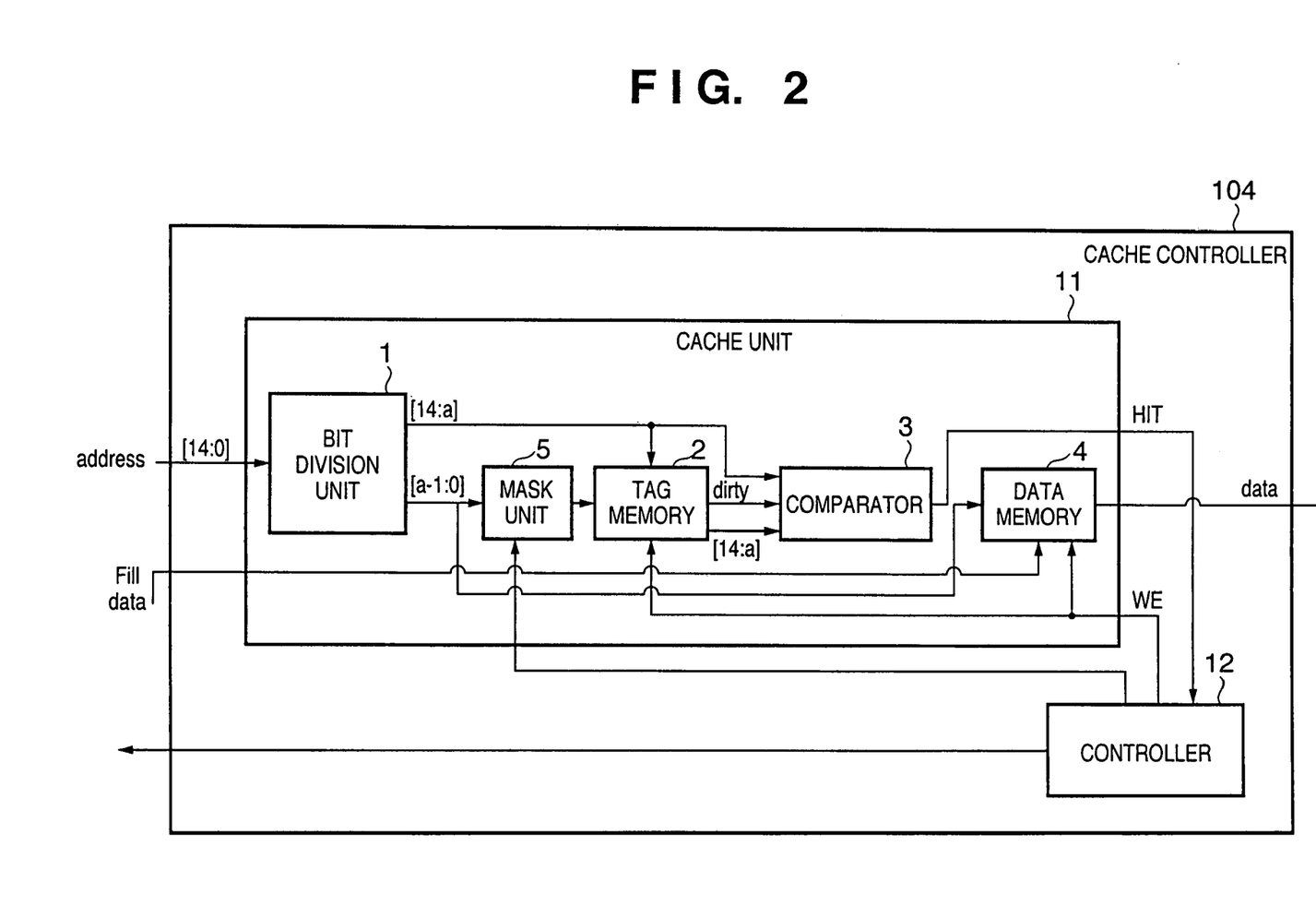
FIG. 2 is a block diagram showing the hardware arrangement of a cache controller 104.

The cache controller 104 will be described below.

FIG. 2 is a block diagram showing the hardware arrangement of the cache controller 104. As shown in FIG. 2, the cache controller 104 includes the cache unit 11 and a controller 12. The cache unit 11 includes a bit division unit 1, tag memory 2, comparator 3, data memory 4, and mask unit 5.

The cache unit 11 will be explained first. The cache unit 11 operates as a cache based on a direct mapping scheme in this embodiment.

The bit division unit 1 receives the LUT address generated by the LUT address generator 103, as described above. As shown in FIG. 2, this LUT address (address) is expressed by 15 bits. The bit division unit 1 divides this 15-bit LUT address into a higher-order address [14:a] and a lower-order address [a−1:0].

Figure 3:
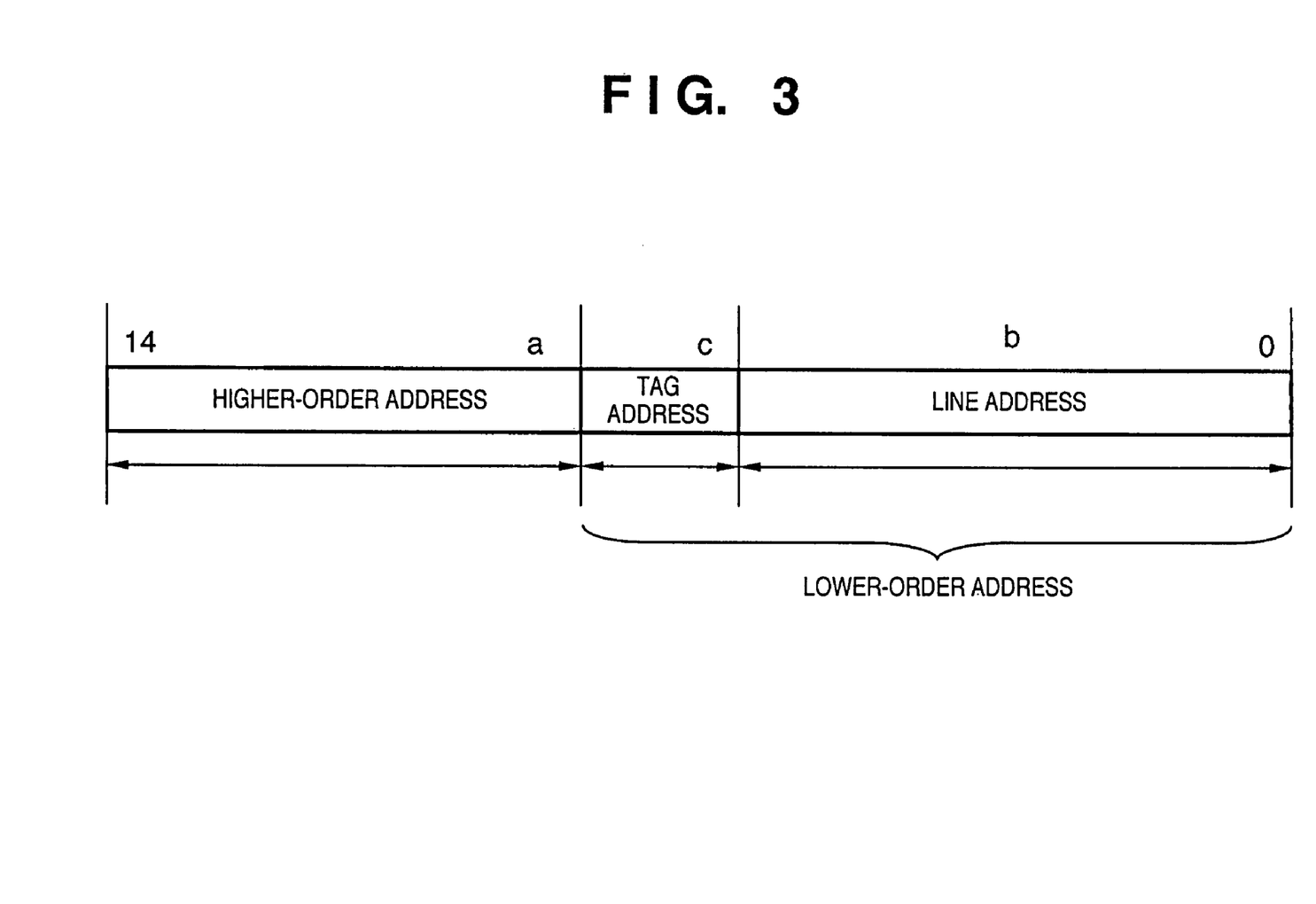
FIG. 3 shows an example of the configuration of an LUT address.

As shown in FIG. 3, the LUT address [14:0] is configured by the higher-order address [14:a] and the lower-order address [a−1:0]. Therefore, the bit division unit 1 divides the LUT address into the higher-order address part and lower-order address part (tag address and line address). FIG. 3 shows an example of the configuration of the LUT address. Note that the number of bits of the tag address is variable.

Normally, in consideration of address continuity (data fill efficiency), the lower-order address of the LUT address is mapped on an entry (address) of the data memory 4, and the higher-order address [14:a] is stored in the tag memory 2.

The tag memory 2 stores the higher-order address [14:a] of the LUT address corresponding to data stored in the data memory 4. As will be described later, the tag memory 2 holds the higher-order address received from the bit division unit 1. The data memory 4 holds a set of the lower-order address received from the bit division unit 1, and LUT data in the LUT 199 specified by the LUT address input to the bit division unit 1.

Let (a−b) [bits] be the bit width of the address of the tag memory (a maximum bit width that the tag address can assume), and a [bits] be the bit width of the address of the data memory 4.

The comparator 3 compares the higher-order address [14:a] of the LUT address corresponding to data stored in the data memory 4, which address is read out from the tag memory 2, with a higher-order address [14:a] which is currently input via the bit division unit 1. The comparator 3 determines if the higher-order address of the LUT address stored in the tag memory 2 matches that of the LUT address currently input via the bit division unit 1.

As a result, if the two addresses match, the comparator 3 determines a cache hit, and notifies the hit rate determination unit 106 of that hit. In this case, the hit rate determination unit 106 increases the hit rate. Then, the comparator 3 reads out LUT data stored in correspondence with the lower-order address [a−1:0] of the LUT address currently input via the bit division unit 1 from the data memory 4. The comparator 3 outputs the readout LUT data to the interpolation unit 105, and outputs this determination result to the controller 12.

On the other hand, if the two addresses do not match, the comparator 3 notifies the hit rate determination unit 106 of that mishit. In this case, the hit rate determination unit 106 decreases the hit rate. The comparator 3 also notifies the controller 12 of the mishit. Upon reception of this notification, the controller 12 reads out LUT data specified by the current LUT address of those held by the LUT 199 from the LUT 199 (to request the memory address generator 101 to make that access). The controller 12 stores the readout LUT data (Fill data) in the data memory 4, and outputs it to the interpolation unit 105. When the readout LUT data is stored in the data memory 4, it is stored in correspondence with a lower-order address [a−1:0] of the LUT address currently input to the bit division unit 1, and the higher-order address [14:a] of this LUT address is stored in the tag memory 2 in correspondence with the output from the mask unit 5. That is, the tag memory 2 stores the higher-order address [14:a] of the address corresponding to the data stored in the data memory 4 in correspondence with the lower-order address (tag address) which follows that higher-order address.

Note that a dirty bit indicating whether or not the address stored in the tag memory 2 is correct is also stored in the tag memory 2. A case will be examined below wherein a cache hit is determined by only comparison between the data (higher-order address) read out from the tag memory 2 and the higher-order address of the LUT address. In this case, even if no data is stored in the data memory 4, if data read out from the tag memory 2 just happens to match the input LUT address, the comparator 3 determines a cache hit, and non-related data is output.

To prevent this, a dirty bit (or valid bit) is stored in the tag memory 2. Upon initialization, the dirty bit is set (the valid bit is reset). When correct data is stored in the data memory 4, the dirty bit of this address is reset (the valid bit is set). By monitoring the dirty bit (valid bit), whether or not the address stored in the tag memory 2 is correct is determined. If there is an address which does not exist (is not used) in practice, that address may be stored in the tag memory 2, thus also preventing the above operation error.

Note that the dirty bit (valid bit) may be stored in a memory (or register) independently of the tag memory so as to omit initialization of the tag memory. In this case, the cache can be initialized by only initializing the dirty bit (valid bit).

In order to improve the fill efficiency of the cache, the cache normally undergoes fill processing in a predetermined unit (called "line"). When such fill processing is made, the number of entries of the tag memory 2 is reduced (if the predetermined unit is 16, b=4, and the lower 4 bits are deleted from the address input of the tag memory 2). That is, In this case, all data which match addresses obtained by excluding the lower 4 bits are stored in the data memory 4.

The operations of the hit rate determination unit 106 and the cache controller 104 which control the bit widths of the tag address and line address, which form the lower-order address of the LUT address, in accordance with the cache hit rate will be described below. In this embodiment, a case without any pre-scan will be explained.

At the beginning of the operation of the cache controller 104, the bit width of the tag address is set to have a minimum configuration. That is, if the bit width of the tag address has a minimum configuration, as shown in FIG. 3, the bit width of the tag address is set to be (a−c) bits, and that of the line address is set to be c bits.

Figure 4:
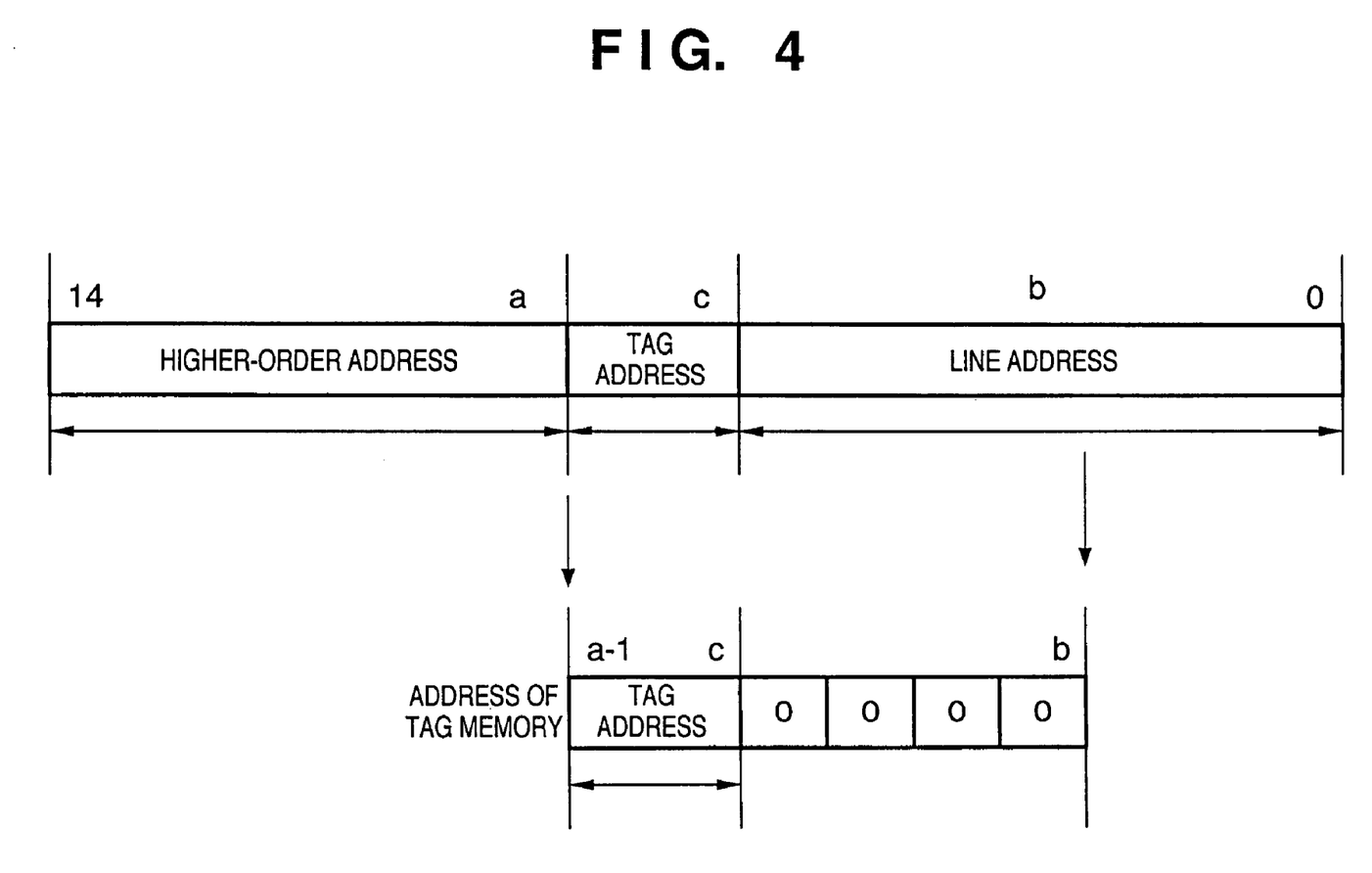
FIG. 4 is a view for explaining mask processing by a mask unit 5.
Figure 5:
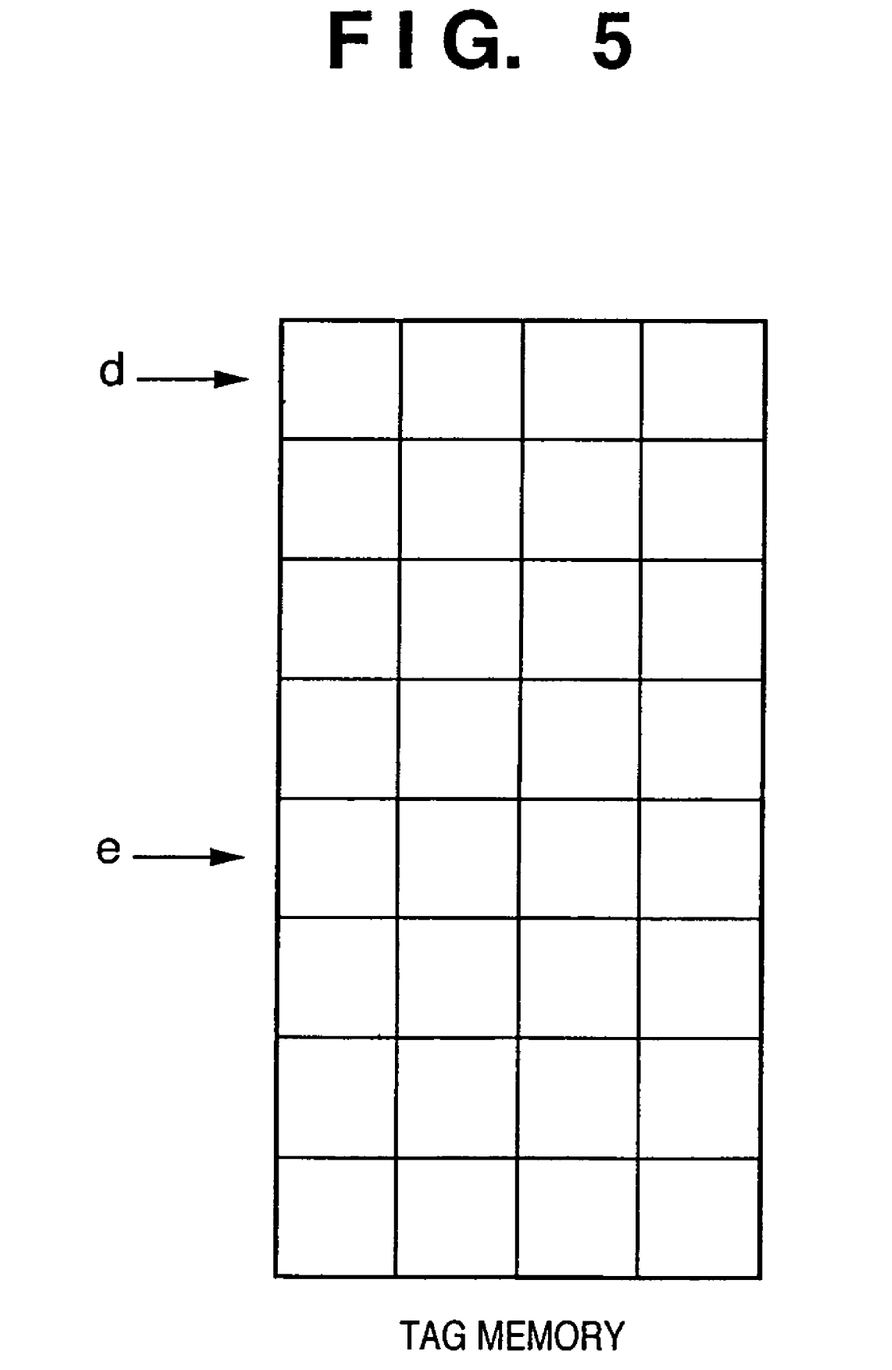
FIG. 5 shows the memory map of a tag memory 2.

The mask unit 5 masks, to zero, the lower (c−b) bits of the (a−b) bits as the bit width of the address of the tag memory 2 of the lower-order address [a−1:0] received from the bit division unit 1. That is, as shown in FIG. 4, the address of the tag memory 2 becomes zero other than the tag address. As a result, the tag memory 2 stores higher-order addresses at partial (discrete) addresses like d and e of the tag memory 2, as shown in FIG. 5. FIG. 4 is a view for explaining the mask processing of the mask unit 5. FIG. 5 shows the memory map of the tag memory 2. The mask unit 5 masks bits other than the address to be compared (tag address) of the address of the tag memory (a range [a−1:0] from a first predetermined bit position to a second predetermined bit position).

The bit rate determination unit 106 monitors the cache hit rate, and when the average number of cycles becomes equal to or lower than a predetermined value due to a hit rate drop, the unit 106 notifies the controller 12 of the cache controller 104 of that fact, thus increasing the bit width of the tag address. For example, let F be the number of cycles required for the fill processing of the cache, H be the hit rate, and Th be a threshold of the average number of cycles. Then, if $$F \times (1-H) + 1 \times H \leq Th \quad (1)$$

does not hold, the bit width of the tag address is increased. For example, when the average number of cycles is to be set to be equal to or lower than 4, Th=4, and if the number of cycles required for the fill processing of the cache at that time is 50, inequality (1) above is:

$$H \geq (50-4)/(50-1) = 0.938775$$

and it is understood that a hit rate of about 93.8% or more is required. Note that the calculation of the hit rate does not include an address in which the dirty bit is set. This is because no data is stored in the cache in an initial state, and the hit rate deteriorates if the address in which the dirty bit is set is also counted. In this embodiment, in consideration of the switching timing of a local variation factor, after conversion of a certain number of pixels is completed, switching of the bit width is determined in a predetermined pixel count unit.

Figure 6:
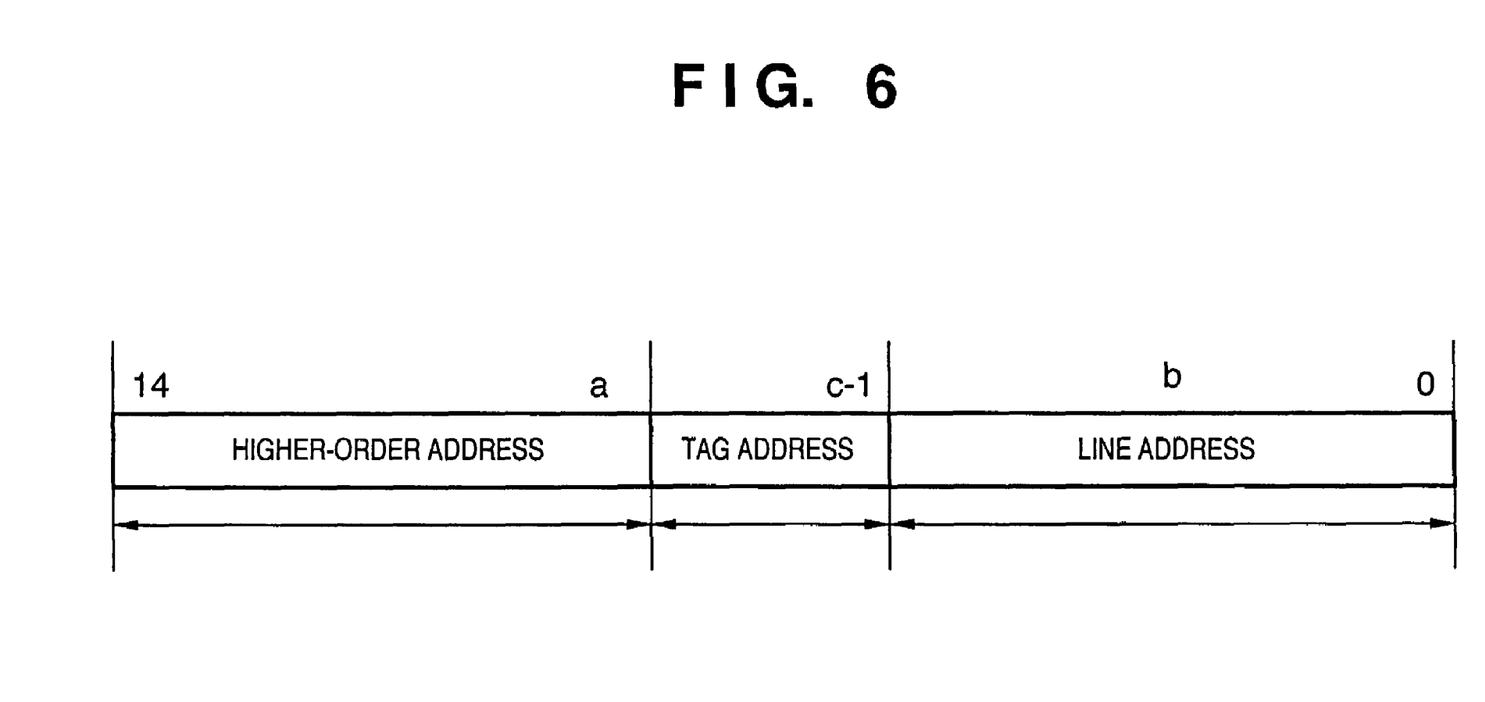
FIG. 6 shows an example of the configuration of an LUT address after the bit width of a tag address is changed.

If the hit rate does not satisfy inequality (1) above, the bit width of the tag address is set to be (a−c+1) bits, and that of the line address is set to be (c−1) bits, as shown in FIG. 6. FIG. 6 shows an example of the configuration of the LUT address after the bit width of the tag address is changed.

Figure 7:
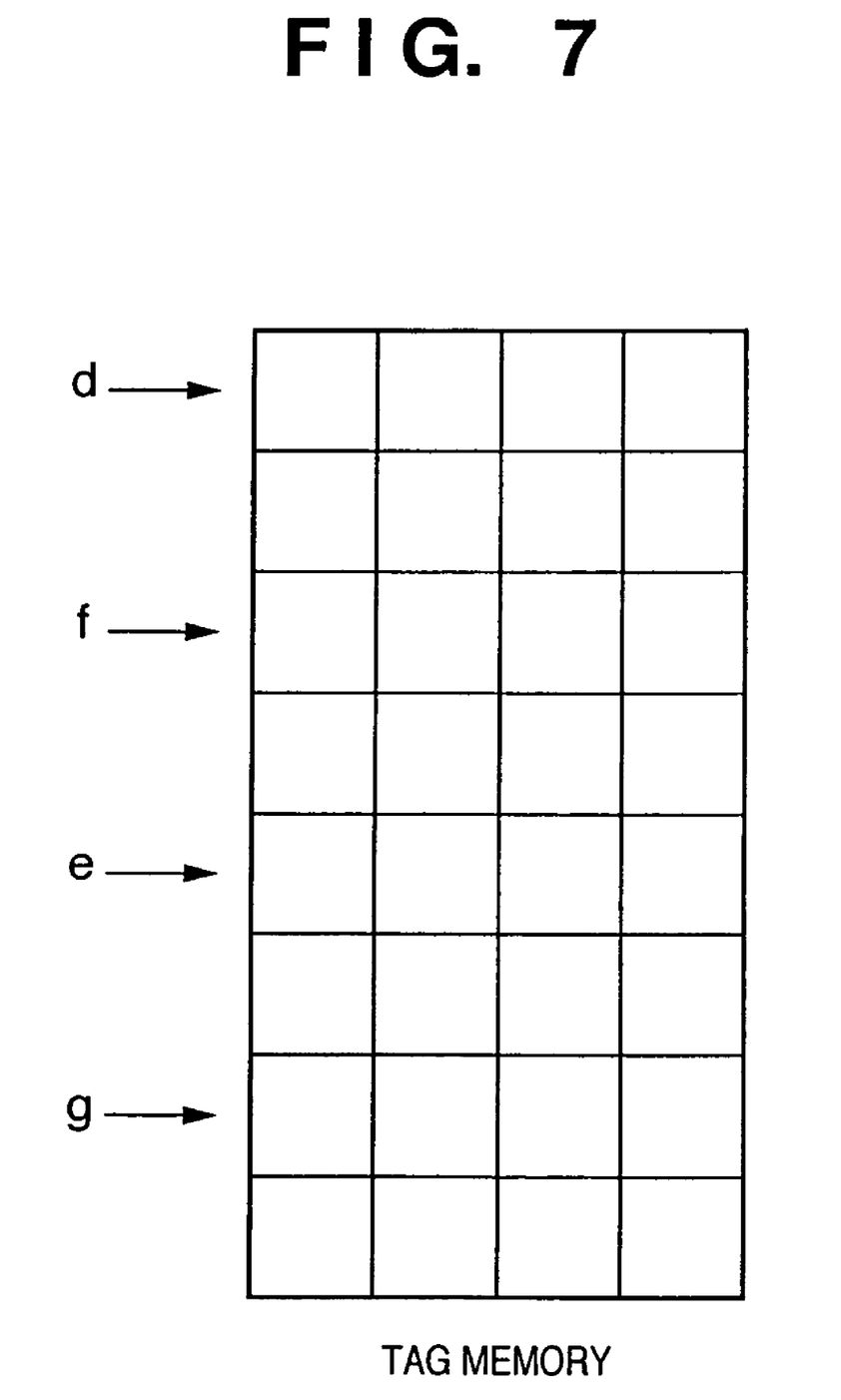
FIG. 7 shows the memory map of the tag memory 2 corresponding to the LUT address after the bit width of a tag address is changed.

That is, the mask unit 5 masks, to zero, the lower (c−b−1) bits of the (a−b) bits as the bit width of the address of the tag memory 2. As a result, since the tag address is increased by 1 bit, the number of addresses (entries) that can be stored in the tag memory 2 increases, and higher-order addresses can be stored at addresses f and g, as shown in FIG. 7. FIG. 7 shows the memory map of the tag memory 2 corresponding to the LUT address after the bit width of the tag address is changed.

However, data corresponding to the tag addresses (entries) when 1 bit is increased are invalid. Therefore, the dirty bit of the tag address (entry), the number of increased bits of which is 1, must be set. Alternatively, a higher-order address stored at a tag address (entry), the number of increased bits of which is zero, must be copied to the tag address, the number of increased bits of which is 1, thus resetting the dirty bit of the tag address, the number of increased bits of which is 1. In the initial state, since the dirty bit is set, no operation error occurs intact. In the example of FIG. 7, data stored at d is copied to f, and data stored at e is copied to g, thus resetting dirty bits at f and g.

Figure 8:
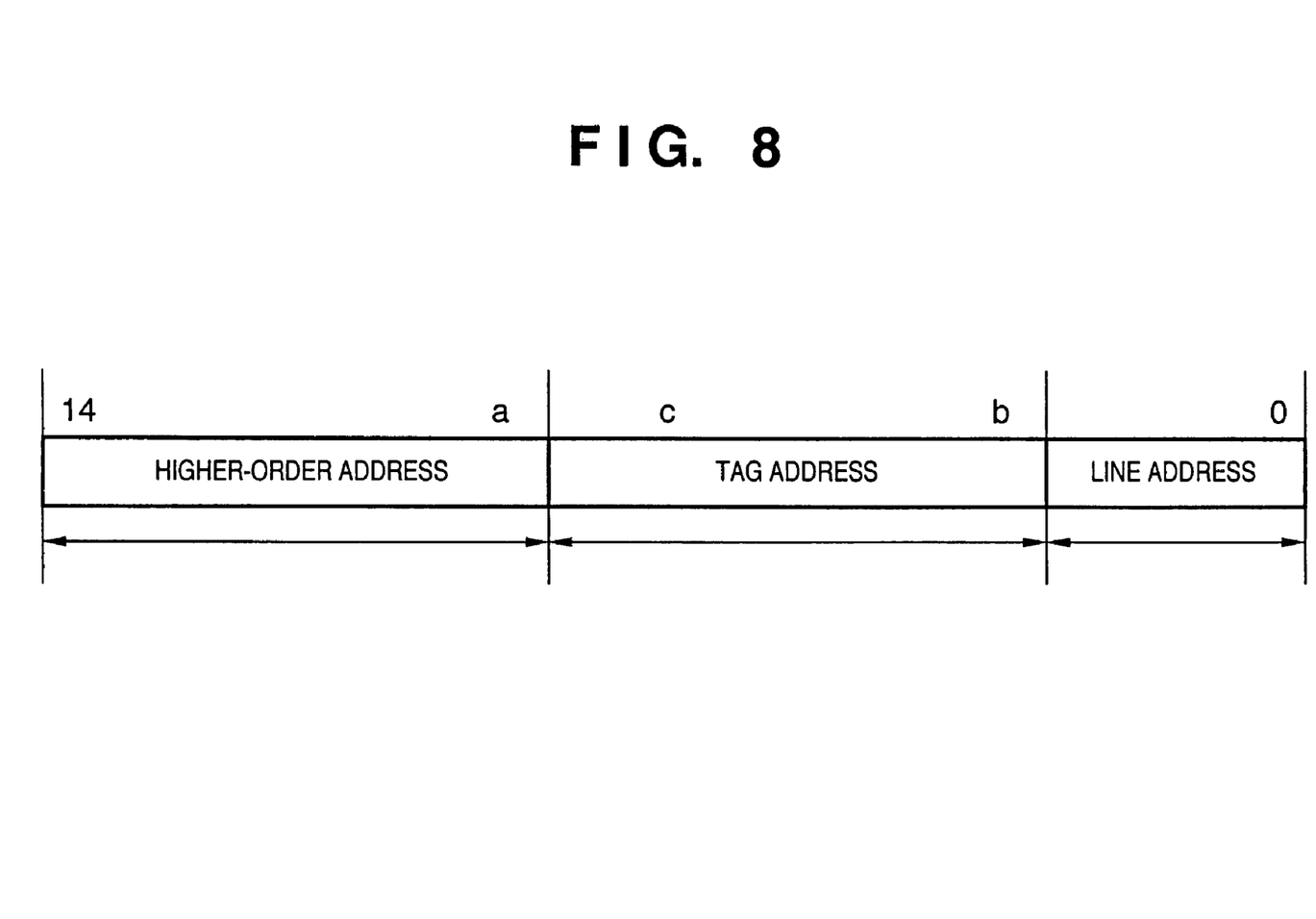
FIG. 8 is a view for explaining the end condition of bit width change processing of the tag address.

In this way, the bit width of the tag address is increased until the hit rate satisfies inequality (1) above. However, as shown in FIG. 8, when the input bit width of the tag address becomes (a−b) bits, and that of the line address becomes b bits, that of the tag address has a maximum configuration. Therefore, in such case, even when inequality (1) does not hold, the assignments of the tag address and line address are left unchanged.

The bit width of the tag address is kept increased, and that of the line address is kept decreased until the hit rate exceeds the set threshold. With such manipulation, the entire data conversion processing including the refill efficiency of the cache can be improved. As described above, the refill unit of the cache is a line unit. That is, if a cache mishit has occurred, data which has a common higher-order address [14:a] and tag address is read out from the memory 102 (LUT 199), and is stored in the data memory 4 in correspondence with the tag address and line address.

Figure 9:
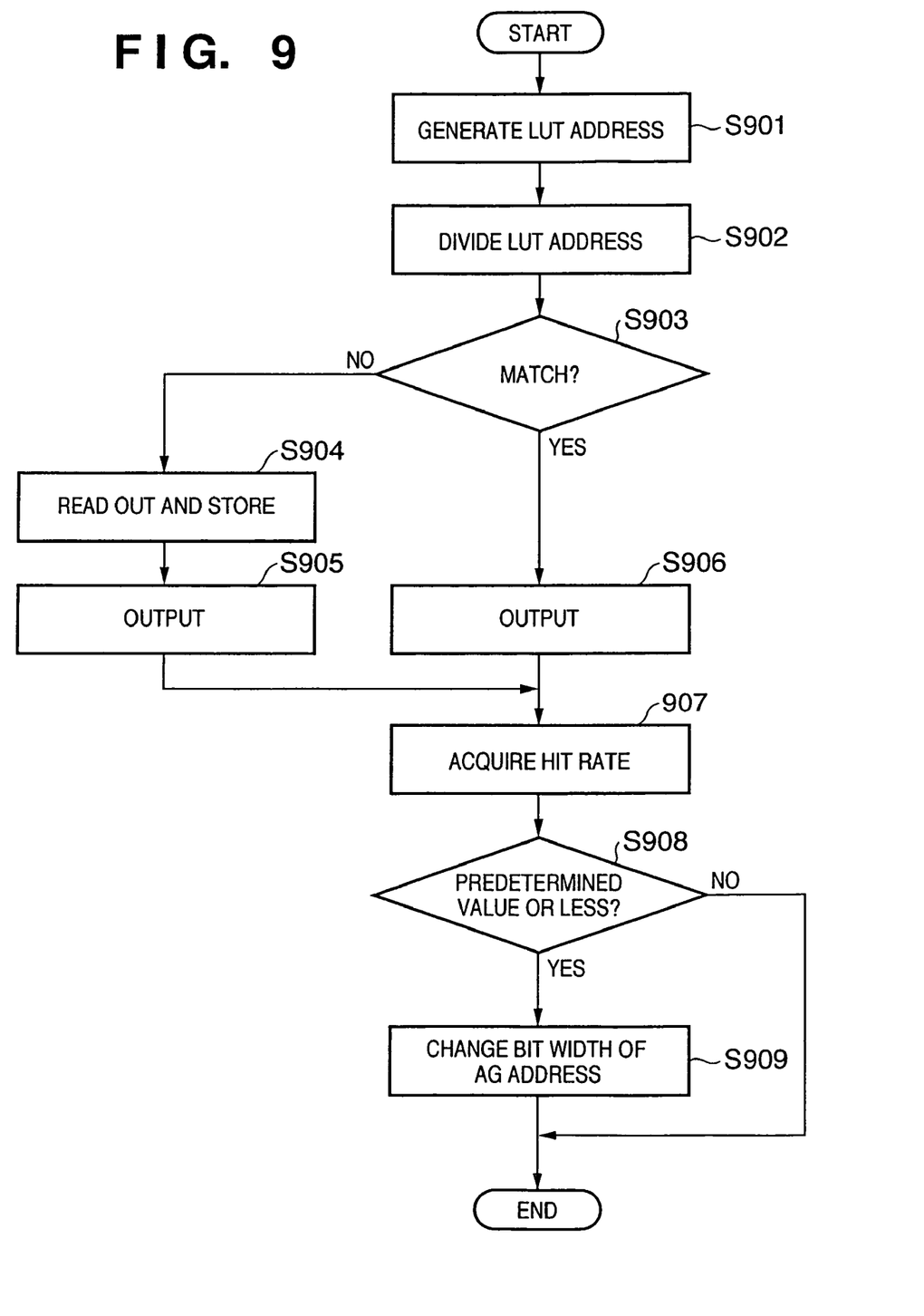
FIG. 9 is a flowchart of the processing executed by the cache controller 104 and a hit rate determination unit 106 when an LUT address generator 103 generates one LUT address.

FIG. 9 is a flowchart of the processing executed by the cache controller 104 and hit rate determination unit 106 when the LUT address generator 103 generates one LUT address.

The LUT address generator 103 generates an LUT address [14:0] corresponding to input data (step S901). Next, the bit division unit 1 divides the LUT address generated by the LUT address generator 103 into a higher-order address [14:a] and lower-order address [a−1:0] (step S902).

The mask unit 5 masks and outputs a predetermined number of lower bits (bits other than the tag address) of the lower-order address [a−1:0] of the LUT address output from the bit division unit 1. The tag memory 2 outputs data at the address designated by the output from the mask unit 5. The comparator 3 checks if the higher-order address [14:a] of the LUT address currently input via the bit division unit 1 matches data output from the tag memory 2 (step S903). That is, the comparator 3 compares the address corresponding to data stored in the data memory 4 with that generated by the LUT address generator 103. Since the higher-order address stored in the input tag address is read out from the tag memory 2, the comparator 4 consequently checks if data whose higher-order of the LUT address matches the tag address is stored in the data memory 4.

If the two addresses do not match, the comparator 3 determines no cache hit, and the flow advances to step S904. The controller 12 reads out LUT data specified by the memory address currently generated by the memory address generator 101 of those held by the LUT 199 (to request the memory address generator 101 to make that access). The controller 12 stores the readout LUT data in the data memory 4. Note that the readout LUT data is stored in the data memory 4 in correspondence with the lower-order address [a−1:0] of the LUT address currently input from the bit division unit 1. In addition, the higher-order address [14:a] of this LUT address is stored in the tag memory 2. The LUT data read out from the LUT 199 is output to the interpolation unit 105 (step S905). If no data corresponding to the LUT address is stored in the data memory 4, the comparator 3 reads out corresponding data from the memory 102 (LUT 199) and outputs the readout data to the interpolation unit 105.

On the other hand, if the two addresses match, the comparator 3 determines a cache hit, and the flow advances to step S906. The comparator 3 reads out LUT data stored in correspondence with the lower-order address [a−1:0] of the new LUT address currently input via the bit division unit 1, and outputs the readout LUT data to the interpolation unit 105. That is, the comparator 3 reads out data corresponding to the LUT address from the data memory 4, and outputs the readout data to the interpolation unit 105.

Regardless of which of the cache hit or mishit happens, the comparator 3 notifies the hit rate determination unit 106 of this, and the hit rate determination unit 106 calculates a new hit rate.

The hit rate determination unit 106 acquires a cache hit rate (step S907). If the hit rate becomes equal to or lower than the predetermined value (step S908), the controller 12 determines the bit width of the tag address and line address by increasing the bit width of the tag address (step S909). That is, the controller 12 determines the number of bits of an address to be compared by the comparator 3 in accordance with the comparison result of the comparator 3. Note that the comparator 3 compares both the higher-order address [14:a] and tag address.

The controller 12 notifies the mask unit 5 of the determined bit width, which is used to determine bits to be masked in the tag address.

The case without any pre-scan has been explained. In case with a pre-scan (or identical image conversion), the bit widths of the tag address and line address are determined in the pre-scan. After the bit widths of the tag address and line address are determined, main scan processing is executed.

In this embodiment, continuous data on the LUT space are desirably stored in a line when the tag has the minimum number of entries. Since the size of the data memory 4 is constant, the address input of the data memory 4 is left unchanged even after the bit width of the tag address is changed.

Therefore, the bit width of the higher-order address of the LUT address to be stored in the tag memory is left unchanged.

When the frequency of occurrence of a change in upper bits of the masked tag memory address becomes equal to or lower than a predetermined value, the bit width of the tag address may be decreased. When the higher-order address of the LUT address stored at the tag address, the number of decreased bit of which is 1, is different from that of the LUT address stored at the tag address, the number of decreased bit of which is 0, the following processing is required. That is, the dirty bit of the at the tag address, the number of decreased bit of which is 0, must be set.

Note that the above embodiment can be established even when a known cache configuration (e.g., 2-way set associative method or the like) is used in place of the aforementioned cache mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-241557, filed on Aug. 23, 2005, which is hereby incorporated by reference herein in its entirety.

What is claimed is:

1. A memory apparatus comprising:
    a first memory unit;
    a second memory unit;
    a generation unit constructed to generate an address corresponding to input data;
    a comparison unit constructed to obtain a hit rate of data stored in said second memory unit by comparing an address corresponding to data stored in said second memory unit and the address generated by said generation unit;
    a read-out unit constructed to read out data corresponding to the address generated by said generation unit from said second memory unit; and
    a determination unit constructed to determine the number of bits of each address to be compared by said comparison unit in accordance with the hit rate,
    wherein when the data corresponding to the address generated by said generation unit is not found in said second memory unit, said read-out unit reads out the corresponding data from said first memory unit.

2. The apparatus according to claim 1, wherein said comparison unit compares the address of the data stored in said second memory unit with a higher-order address of the address generated by said generation unit.

3. The apparatus according to claim 1, wherein said comparison unit comprises a third memory unit constructed to store a higher-order address of the address corresponding to the data stored in said second memory unit in correspondence with a lower-order address which follows the higher-order address.

4. The apparatus according to claim 3, wherein said comparison unit comprises a mask unit constructed to mask bits other than the address to be compared within a range from a first predetermined bit position to a second predetermined bit position of the address generated by said generation unit.

5. The apparatus according to claim 1, wherein said determination unit determines the number of lower bits of the address to be compared by said comparison unit.

6. A memory control method in a memory apparatus which has a first memory and a second memory, comprising:
    generating an address corresponding to input data;
    obtaining a hit rate of data stored in the second memory by comparing an address corresponding to the data stored in the second memory and the generated address;
    reading out data corresponding to the generated address from the second memory; and
    determining the number of bits of each the address to be compared in accordance with the hit rate, wherein the read-out step includes a step of reading out, when the data corresponding to the generated address is not found in the second memory, the corresponding data from the first memory.

7. The method according to claim 6, wherein the comparison step includes a step of comparing the address of the data stored in the second memory with a higher-order address of the generated address.

8. The method according to claim 6, wherein the comparison step comprises a storage step of storing, in a third memory, a higher-order address of the address corresponding to the data stored in the second memory in correspondence with a lower-order address which follows the higher-order address.

9. The method according to claim 8, wherein the comparison step comprises a mask step of masking bits other than the address to be compared within a range from a first predetermined bit position to a second predetermined bit position of the generated address.

10. The method according to claim 6, wherein the determination step includes a step of determining the number of lower bits of the address to be compared.

* * * * *